(12) United States Patent
McKillop

(10) Patent No.: US 7,813,697 B2
(45) Date of Patent: Oct. 12, 2010

(54) POWER EFFICIENT HIGH SPEED COMMUNICATION SYSTEMS AND METHODS

(75) Inventor: Christopher D McKillop, La Honda, CA (US)

(73) Assignee: Apple Inc., Cupertino, CA (US)

( * ) Notice: Subject to any disclaimer, the term of this patent is extended or adjusted under 35 U.S.C. 154(b) by 693 days.

(21) Appl. No.: 11/804,359

(22) Filed: May 18, 2007

(65) Prior Publication Data

US 2008/0166967 A1 Jul. 10, 2008

Related U.S. Application Data

(60) Provisional application No. 60/878,854, filed on Jan. 5, 2007.

(51) Int. Cl.
*H04B 7/00* (2006.01)
(52) U.S. Cl. .................. 455/41.2; 455/41.1; 455/73; 455/78; 455/343.2
(58) Field of Classification Search ........... 455/41.1, 455/41.2, 73, 78, 343.2, 343.8
See application file for complete search history.

(56) References Cited

U.S. PATENT DOCUMENTS

| 6,195,564 B1 * | 2/2001 | Rydbeck et al. ............. 455/557 |
| 6,728,729 B1 | 4/2004 | Jawa et al. |
| 7,336,926 B2 * | 2/2008 | Noda et al. ................ 455/41.2 |
| 2005/0059345 A1 * | 3/2005 | Palin et al. ................ 455/41.2 |

* cited by examiner

*Primary Examiner*—Tuan A Pham
(74) *Attorney, Agent, or Firm*—Kramer Levin Naftalis & Frankel LLP

(57) ABSTRACT

Systems and methods for utilizing multiple wireless communication protocols are provided. In one embodiment, the portable device includes circuitry for providing wireless communications utilizing a low power, relatively slow communications protocol, such as Bluetooth, to establish a communications path between two wireless devices. When high speed communications are preferred, the two devices can agree to switch to a different, high speed protocol, such as Wi-Fi, for communications. In this manner, power loss is minimized while one of the devices is seeking another communications node. In another embodiment, the high speed communications are performed utilizing a private network established between the two devices in which a non-standard protocol is utilized. That protocol could be, for example, a minimized subset of 802.11 instructions.

21 Claims, 4 Drawing Sheets

POWER EFFICIENT HIGH SPEED COMMUNICATION SYSTEMS AND METHODS

This application claims the benefit of U.S. Provisional Application No. 60/878,854, filed Jan. 5, 2007, the disclosure of which is incorporated by reference herein in its entirety.

BACKGROUND OF THE INVENTION

This relates to electronic devices and more particularly to methods and systems for performing high speed wireless communication in a power efficient manner.

Portable electronic devices, such as wireless and cellular telephones, digital media players (e.g., music players and video players), and hybrid devices that combine telephone and media playing functionality are known. These devices are typically configured to provide communications to a user in one or more modes. For example, a laptop computer such as the MacBookPro may be configured to communicate wirelessly in accordance with both the Wi-Fi and the Bluetooth standards. Wi-Fi communications are generally characterized as high speed communications that take a relatively large amount of power to maintain. Bluetooth communications are generally characterized as low speed, short range communications that take significantly less power to maintain than Wi-Fi.

One common characteristic of portable electronic devices is that, in the view of many users, they never have enough battery life. This is due to a variety of factors, including the simple fact that the devices are portable. Thus, it would be possible to extend the battery life of the devices by, for example, providing larger batteries, but that would invariably lead to devices that are too heavy, too expensive and too bulky. Therefore, it can be problematic if the method of wireless communications places too heavy a load on the limited amount of electrical power available to the portable devices.

In order to try and provide the appropriate level of speed versus power consumption, electrical devices such as laptops often are capable of using different methods of wireless communications depending on the need. One common use of Bluetooth wireless communications, for example, is communications between the laptop computer and a printer. Such communications do not require high speed access due to the nature of the data being transferred and the speed at which it is used by the receiving device. In addition, the physical distance between a laptop computer and a printer under such circumstances is typically small, making such communications well-suited for Bluetooth.

On the other hand, if the laptop user needs to access the internet, Bluetooth communications will likely leave the user disappointed, due in large part, to the relatively low limits on communication speed. For example, if the transfer of a single song takes five seconds using Wi-Fi (assuming that the 802.11g standard is used), the same transfer using Bluetooth at current maximum speed would take more than a minute and a half. Therefore, the laptop typically accesses the internet using a high speed wireless connection such as Wi-Fi. Wi-Fi connections have a greater range (i.e., the computer can be farther away from the router than would be required using the Bluetooth protocol) and operate at significantly higher speeds, but at the cost of greater power consumption.

One problem with this scenario, is that most laptops typically have the Wi-Fi hardware and software running constantly, even if the internet browser is not being used. For example, a user might open the laptop to edit a letter written in a word processing program. Most users are not aware that the Wi-Fi hardware and software are also activated and are constantly sending out and receiving messages from other Wi-Fi points of access, even though the user is not utilizing that connection. This leads to the stored battery power being drained at a substantially higher rate that would otherwise occur.

Accordingly, what is needed are methods and systems for providing intelligent wireless communications, in which the system selects the proper mode for wireless communications based on throughput and power consumption.

SUMMARY OF THE INVENTION

Systems and methods for managing the providing intelligent wireless communications are provided.

In one embodiment, the systems and methods of the present invention can be implemented in a device such as a cell phone that includes an application portion and a carrier portion. The carrier portion can include circuitry for performing telephone functions (e.g., transmitting data to and receiving data from a communications tower). The carrier circuitry can include circuitry for other wireless communication functions, such as to enable Bluetooth and Wi-Fi communication methods. The application portion may include all other circuitry not specifically reserved for the carrier circuitry. For example, the application portion may include a processor, memory (e.g., for storing media files), SDRAM, a display, and other circuitry. In this instance, the application portion could perform an analysis in any given situation in order to determine a highly efficient manner for wireless communications.

For example, the application portion could be configured to command the carrier portion into a low power standby mode in normal situations. Once a command is issued for some form of wireless communications to occur, the application portion could issue a wake-up command to the carrier portion. The application portion could also evaluate the request in order to determine the best communications protocol to use, based on needed throughput, current power reserve and the physical proximity between communicating stations. Assuming adequate power is available, the system could utilize the fastest communications protocol available.

In many situations, however, the amount of stored battery power may be very important, even if the battery is fully charged. This might be particular advantageous if the portable electronic device is, for example, a cellular telephone. In that instance, power should be reserved, to whatever extent possible, for use by the phone as a phone.

The systems and methods of the present invention can provide highly power efficient wireless communications by utilizing a low power, limited range protocol, such as Bluetooth, in order to find and establish a high speed communications path. Once the high speed communications path is found, such as a Wi-Fi network, the systems and methods can switch from the slower communications protocol to the high speed protocol until the particular event is over.

For example, a user might want to download a series of pictures into the cellular phone. The pictures could be stored in any one of the commonly known formats, such as JPEG or TIFF, or other formats. Once the user directs the phone to begin obtaining the pictures, the application portion could direct the carrier portion to begin Bluetooth communications in a "ping" mode, where the phone is constantly looking for another Bluetooth device to communicate with while using a minimal amount of power. Once another Bluetooth device is located, the phone could establish a communications path by completing a handshake process with the other device. As part of that process, the phone could determine whether the device also has a high speed communications capability, such as Wi-Fi.

Once a device is found that is capable of communicating in Bluetooth and in Wi-Fi, the phone and the device could agree to switch communication modes from Bluetooth to Wi-Fi for a dedicated event to occur, such as the photo download. Both devices would then switch into Wi-Fi mode and begin communicating. Once the user completed downloading the photos into the phone, both devices could switch back into Bluetooth mode, or the wireless capability of one or both devices could be placed in standby mode.

In another embodiment, the user could be utilizing a laptop computer that includes the capability to communicate wirelessly using both the Bluetooth protocol and the Wi-Fi protocol. The system could be configured to place the communications circuitry in a standby mode if the communications circuitry is inactive for a predetermined amount of time. When wireless communications are requested by the user, such as by starting the system's internet browser, the laptop could begin by utilizing the Bluetooth communications protocol to try and find a Wi-Fi entry point. The laptop and the other device could then both agree to switch to Wi-Fi to take advantage of the higher bandwidth. Once the Wi-Fi communications were no longer needed, the system could return to Bluetooth mode, or the system could place the communications circuitry in standby mode.

In another embodiment, two users of portable media devices, such as iPods with wireless capability, could desire to exchange personal information. For example, one user might have a digital movie stored on his wireless iPod. The users would each direct the wireless iPods into communication mode, which would cause the devices to begin operating in Bluetooth mode. Once a direct communications path was established between the devices, via handshaking, etc., the two devices could switch into a high speed mode utilizing a different protocol.

While it could be possible to switch into a Wi-Fi mode that is compliant with the 802.11g specification (or 802.11b for that matter), it is also within the scope of the present invention, that the two devices could begin communicating as a private network in which only a minimum amount of the 802.11 requirements would be implemented to increase the power and throughput efficiency of the communications.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
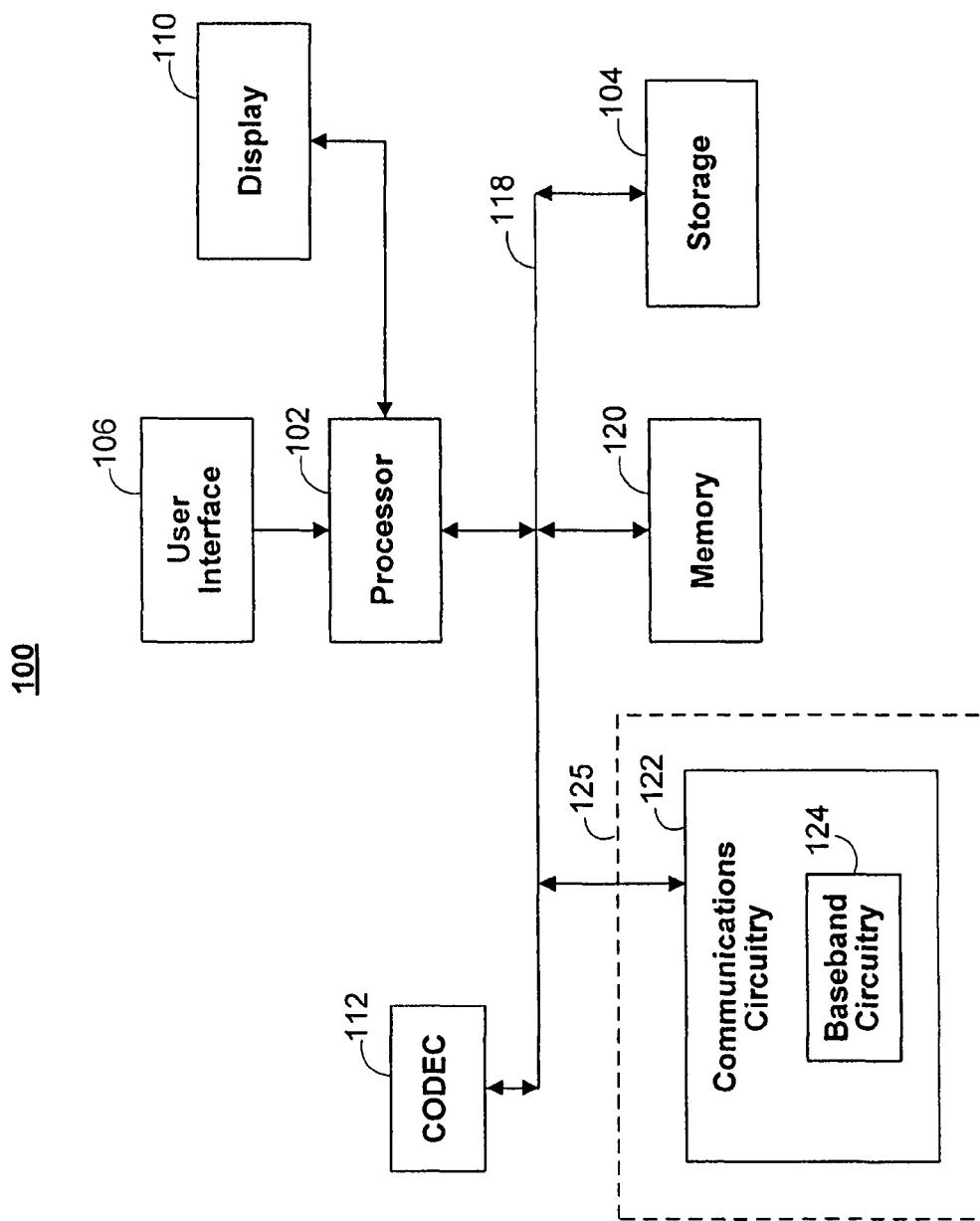
FIG. 1 shows a simplified block diagram of portable electronic device in accordance with an embodiment of the present invention.

FIG. 1 shows a simplified block diagram of illustrative portable electronic device 100. Electronic device 100 may include processor 102, storage device 104, user interface 106, display 110, CODEC 112, bus 118, memory 120 and communications circuitry 122. CODEC 112 may be a single CODEC that can be stored permanently on media player 100, or it can include multiple CODECs. Processor 102 can control the operation of many functions and other circuitry included in media player 100. Processor 102 may drive display 110 and may receive user inputs from user interface 106. Electronic device 100 may be a computer, cellular telephone, portable media device or other similar device without departing from the spirit of the present invention. What is important for the present invention, is that electronic device 100 must be capable of communicating wirelessly in accordance with more than one wireless protocol.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory 120 may be provided for storing firmware for device applications (e.g., operating system, user interface functions, and processor functions).

Bus 118 may provide a data transfer path for transferring data to, from, or between storage device 104, baseband circuitry 124, memory 120 and processor 102. Coder/decoder (CODEC) 112 may be included, for example, to convert digital audio signals into an analog signal, which may be provided to an output port (not shown). For the purposes of the present invention, CODEC 112 is intended to represent the specific encoder that is required to perform whatever function electronic device 100 is being tasked to perform. For example, if electronic device 100 is being tasked to playback music files that have been compressed and stored using the AC3 CODEC, then CODEC 112 needs to be the AC3 CODEC in order for electronic device 100 to properly decompress and playback the music file.

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). It is understood that the carrier circuitry portion operates independent of other device components operating in device 100. That is, carrier circuitry may be an independently operating subsystem within device 100 that may communicate with other components within device 100.

User interface 106 may allow a user to interact with electronic device 100. For example, the device for user input 106 can take a variety of forms, such as at least one button, keypad, dial, a click wheel, a touch screen or any combination thereof. Communications circuitry 122 may include circuitry for wireless communication (e.g., short-range and/or long range communication). For example, the wireless communication circuitry may be Wi-Fi enabling circuitry that permits wireless communication according to one or more of the IEEE 802.11 wireless standards, wired standards or a private network. Other wireless network protocol standards could also be used, either in alternative to the identified protocols or in addition to the identified protocol. An example of another wireless network protocol standard is discussed in commonly assigned Jawa, U.S. Pat. No. 6,728,729, issued Apr. 27, 2004, titled Accessing Media Across Networks. Another network standard that may be utilized may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

As stated above, in one embodiment, electronic device 100 may be a portable computing device dedicated to processing media, such as audio and video. For example, device 100 may be a media player (e.g., MP3 player), a game player, a remote controller, a portable communication device, a remote ordering interface, an audio tour player, or other suitable personal device. In another embodiment, electronic device 100 may be a portable device dedicated to providing media processing and telephone functionality in single integrated unit.

Device 100 may be battery-operated and highly portable so as to allow a user to listen to music, play games or video, record video or take pictures, place and take telephone calls, communicate with others, control other devices, and any combination thereof. In addition, device 100 may be sized such that is fits relatively easily into a pocket or hand of the user. By being handheld, device 100 is relatively small and easily handled and utilized by its user and thus may be taken practically anywhere the user travels.

Figure 2:
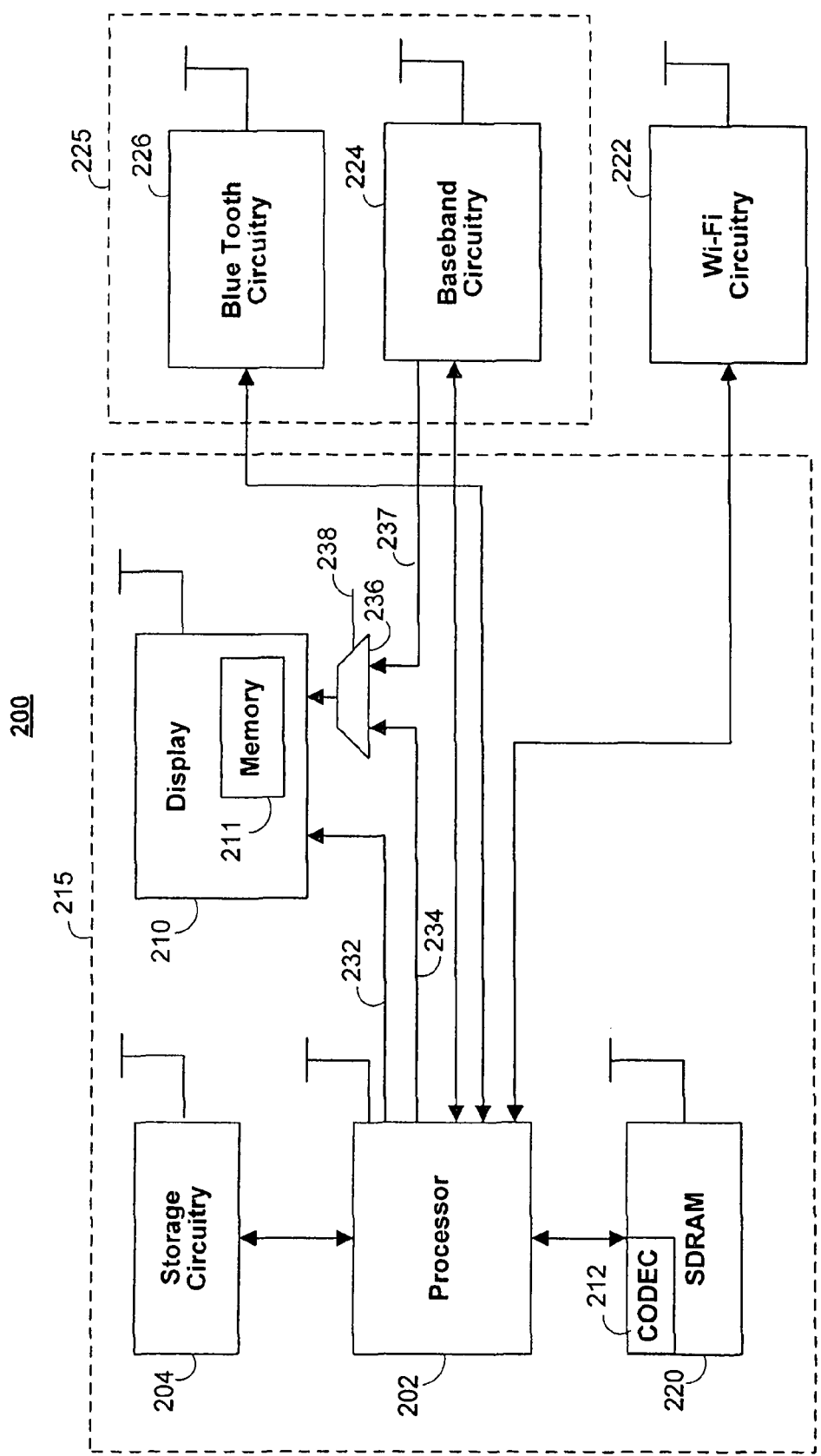
FIG. 2 is a more detailed but simplified block diagram of a device in accordance with an embodiment of the present invention.

FIG. 2 is a more detailed but simplified block diagram of illustrative device 200 constructed in accordance with the principles of the present invention. Device 200 may, for example, be a mobile or cellular telephone or it may be a computer. As the figures are described herein, it should be noted that the use of certain nomenclatures are attempted for clarity. For example, where possible, reference numerals that represent similar circuit elements shall have similar numbering even though they appear on different figures. For example, in FIG. 1, the processor is labeled 102, while in FIG. 2, the processor is labeled 202. Thus, in both cases, the processor is labeled "X02," which indicates that the description for one applies to the other, and vice versa, unless it is noted otherwise.

FIG. 2 shows illustrative application circuitry portion 215 and carrier circuitry portion 225. Carrier portion 225 can include circuitry for performing telephone functions (e.g., transmitting data to and receiving data from a communications tower, utilizing Voice Over Internet Protocols, etc.), such as baseband circuitry 224. Carrier circuitry 225 may also include circuitry for other wireless communication functions such as Wi-Fi circuitry 222 and Bluetooth circuitry 226.

Application portion 215 may include all other circuitry not specifically reserved for carrier portion 225. For example, application portion 215 may include processor 202, storage circuitry 204 (e.g., a hard disk for storing media files), SDRAM 220 and display 210, as well as other circuitry (not shown).

Storage circuitry 204 may be similar to storage circuitry 104 discussed above in connection with FIG. 1 (and thus, the similar numbering of X04). SDRAM 220 may provide content (e.g., instructions) to processor 202 that may enable processor 202 to execute functions of device 200. In certain circumstances, SDRAM 220 may "engage" or "prep" processor 202 by providing it with data to perform one or more functions when device 200 switches from a low power mode to an ON mode (discussed in more detail below). SDRAM 220 may be referred to herein as processor engagement circuitry. For example, when device 200 is operating in a low power mode, SDRAM 220 may store data that may be used to "engage" processor 202 so it knows, for example, a status of device 200 and operate accordingly. In some embodiments, processor 202 and SDRAM 220 may be integrated into a single package. For example, package-on-package technology may be used to provide an integrated processor and memory package. In either case, SDRAM 220 may also be the location in which CODEC 212 is stored.

Display 210 may be any suitable display for displaying media, including graphics, text, and video. In some embodiments, display may be a touch screen display or an LCD. Display 210 may be driven by processor 202 or baseband circuitry 225. When driven by processor 202, a higher bit rate of data may be provided, thereby enabling the display of high resolution graphics, video, and other content to be displayed on display 210. When driven by baseband circuitry 225, a lower bit rate of data may be provided to display screen 210. The data provided by baseband circuitry 225 may be written to display memory 211, which may be memory local to display 210, the contents of which are displayed on display 210. For example, content written to memory 211 and displayed on display 210 may include a clock, a signal strength indicator, and a battery power indicator. This content may be provided by processor 202 or baseband circuitry 225. Though the quantity of data may be less than that provided by processor 202, power consumption may be lower when driving display 210 with baseband circuitry 225 than when being driven by processor 202.

The application portion (e.g., application portion 215) and the carrier portion (carrier portion 225) may each operate in accordance with the principles of the present invention. For example, carrier portion 225 may, as described in more detail below, begin wireless communications in Bluetooth mode by send out low power seek pings (or seek signals). Other Bluetooth enabled devices may respond to the seek signals by essentially stating "I'm over here!" Application portion 215 then directs carrier portion 225 to establish and begin a dialog with the other Bluetooth enabled device. Then, if required, application portion 215 can direct carrier portion 225 to switch from Bluetooth to Wi-Fi for wire less communications (assuming the second device is capable of Wi-Fi communications).

Figure 3:
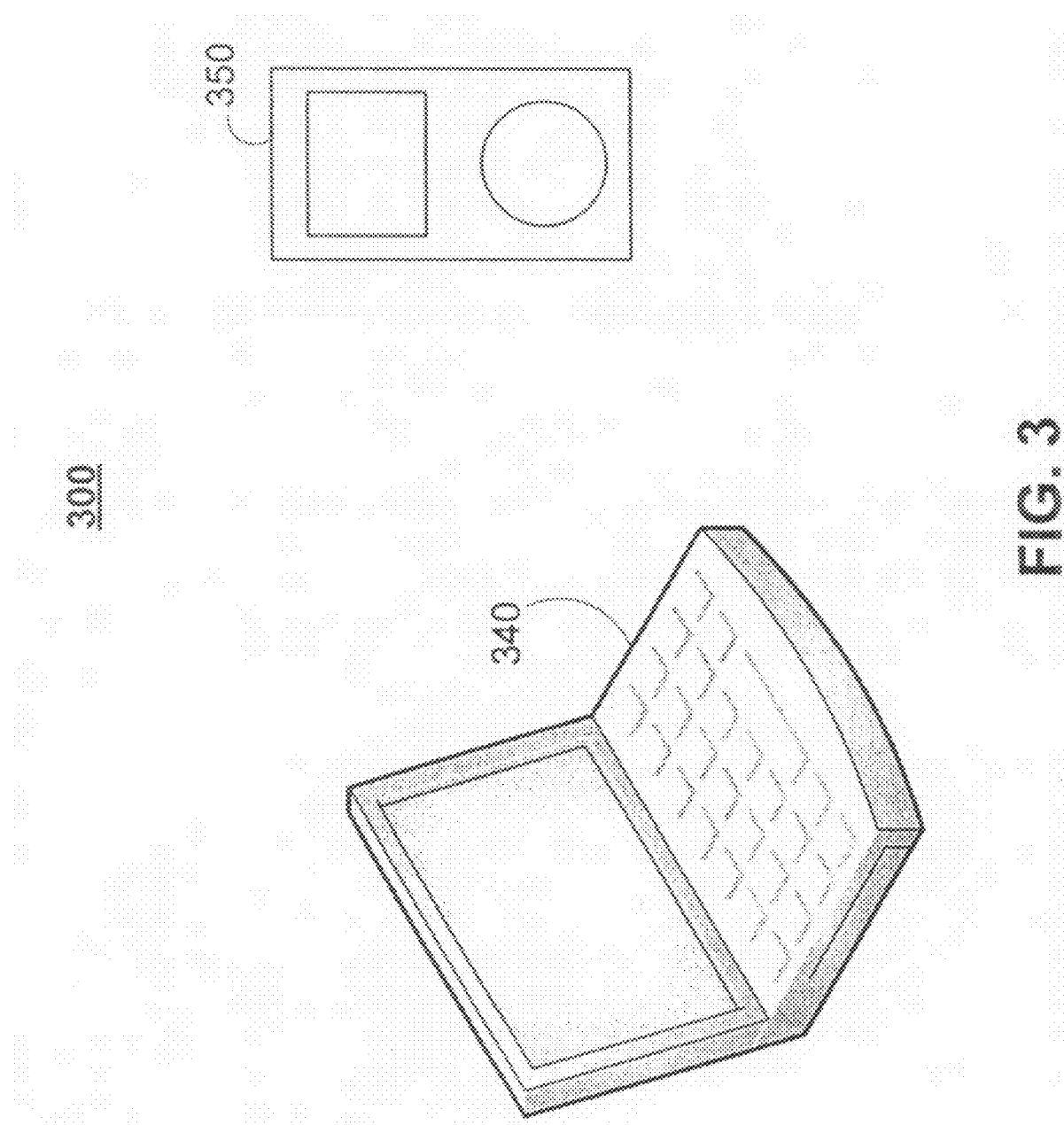
FIG. 3 is an illustration of one embodiment of the present invention.

FIG. 3 shows an illustration of the present invention in multi-media wireless system 300, which may include laptop computer 340 and portable media player 350. Computer 340 may be a battery-operated laptop computer that includes circuitry (not shown, but similar to the circuitry described with respect to FIGS. 1 and 2) that enables computer 340 to communicate with other devices wirelessly. In accordance with the present invention, computer 340 must be able to communicate wirelessly using at least two different protocols, as is described more fully below.

Portable media player 350 is also a battery-operated device that can include circuitry similar to that described with respect to FIGS. 1 and 2. Moreover, portable media device 350 must also be capable of being operated using more than one wireless protocol.

Portable media player 350 can be operated as a first device that might, for example, be used to obtain a video file from computer 340. In order to minimize the loss of battery power, media player 350 would begin operating wirelessly using the Bluetooth protocol while it tries to find another device to communicate with. Eventually, another device such as computer 340 would respond to the seek signal being broadcast by media player 350.

After computer 340 responds to the seek signal, media player 350 utilizes the Bluetooth handshake protocol to establish Bluetooth communication between the devices. There may be instances where Bluetooth communications are acceptable even though the current upper limit on Bluetooth technology is approximately 3 MB per second. If, however, a large data transfer is desired, media player 350 has the ability to cause both devices to switch from Bluetooth communications to a type of Wi-Fi or any other type of communications that is optimized for the situation based on bandwidth and power consumption. For example, media player 350 may switch to Wi-Fi communications to take advantage of the higher bandwidth (currently limited to approximately 54 MB per second) and optimize its power consumption.

Figure 4:
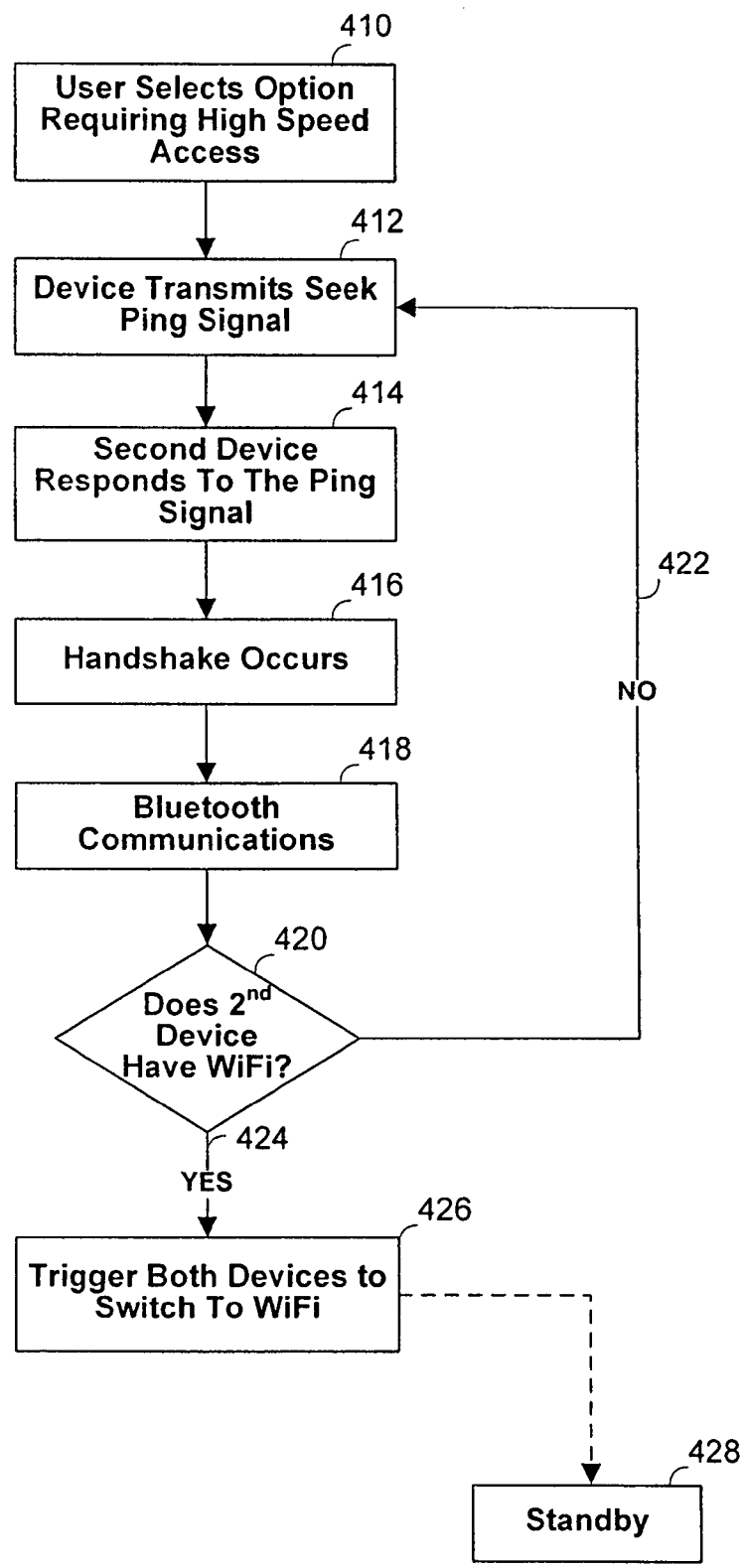
FIG. 4 is an illustration of another embodiment of the present invention.

FIG. 4 is an illustrative flowchart showing various steps of a power efficient wireless communication scheme according to the invention. At step 410, a user selects an option that could require high speed access. This selection by the user causes, at step 412, the wireless circuitry to be brought activated in Bluetooth mode where it begins sending out seek ping signals looking for another Bluetooth device. By using the Bluetooth for the pinging, the device uses significantly less power than if a high speed seek was used.

Eventually, a second device that communicates using the Bluetooth protocol responds at step 414. Once the response is received, the original device initiates a handshaking process, in step 416, and Bluetooth communications begin in step 418. Persons skilled in the art will appreciate that either device could initiate the handshaking process with the other device without departing from the present invention.

In step 420, a determination is made as to whether the second device has the capability to also communicate using the Wi-Fi protocol. If the second device does not have the capability to communicate using Wi-Fi, the system returns to transmitting seek ping signals via path 422. On the other hand, if the second device is capable of Wi-Fi communications, control passes via path 424 to step 426. In step 426, the two devices agree to switch their communication mode to Wi-Fi and high speed communications begin. It is also possible, to further increase the power efficiency of the system, to perform an additional optional step 428 (denoted by a dashed line as being optional), in which the original device powers the wireless circuitry down to a STANDBY mode in which a minimum amount of power is consumed once the need for high speed communications has passed.

It is understood that the steps shown in FIG. 4 are merely illustrative and that existing steps may be modified, added or omitted. For example, persons skilled in the art will appreciate that the low power, low speed protocol need not be Bluetooth and that the high speed, high power protocol need not be Wi-Fi. Alternately, the high speed, high power protocol could be any form of the IEEE 802.11 specification, including 802.11b, 802.11g or other, already finalized communication protocol(s) (such as those used by, e.g., a mobile network like Verizon's VCast mobile network) or some other yet to be finalized protocol or version of a currently existing protocol, such as 802.11n.

Thus it is seen that systems and methods for efficiently managing power while communicating wirelessly with electronic devices are provided. It is understood that the steps shown in the flowcharts discussed above are merely illustrative and that existing steps may be modified, added or omitted. Those skilled in the art will appreciate that the invention can be practiced by other than the described embodiments, which are presented for purposes of illustration rather than of limitation, and the invention is limited only by the claims which follow.

What is claimed is:

1. A method for efficiently controlling power during wireless communications between first and second devices, comprising:
    enabling the first device to seek the second device by transmitting a seek signal in accordance with a low power wireless protocol;
    performing a handshake operation with the second device after the second device responds to the seek signal;
    establishing a communications dialog between the first and second devices in accordance with the low power wireless protocol; and
    causing the first and second devices to switch to a high power, high speed wireless protocol in response to a command from the first device, wherein the command to switch to the high power, high speed wireless protocol is provided when a size of a data transfer between the first and second devices exceeds a predetermined size.

2. The method of claim 1, wherein the low power wireless protocol is Bluetooth.

3. The method of claim 1, wherein the high speed wireless protocol is Wi-Fi.

4. The method of claim 1, further comprising:
    setting wireless circuitry in the first and second devices into a STANDBY state after high speed wireless communications have been idle for a predetermined time period.

5. The method of claim 3, wherein the Wi-Fi protocol utilized by the first and second devices is compliant with at least one of the 802.11 standards.

6. The method of claim 5, wherein the Wi-Fi protocol utilized by the first and second devices is compliant with 802.11g.

7. The method of claim 1, wherein the high speed protocol is used to establish a private, closed network between the first and second devices.

8. A method for establishing relatively high speed wireless communications between first and second electronic devices, comprising:
    causing carrier circuitry in the first device to transmit a seek ping signal;
    performing a handshake operation with the second device after the second device responds to the seek ping signal;
    establishing a communications dialog between the first and second devices in accordance with a low power, low speed communications protocol; and
    causing the first and second devices to switch to a high power, high speed communications protocol for data transmission, wherein the switch to the high power, high speed wireless protocol is provided when a size of a data transfer between the first and second devices exceeds a predetermined size.

9. The method of claim 8, further comprising:
setting wireless communication circuitry in the first device to a STANDBY mode after completion of the data transmission utilizing the high speed communications protocol.

10. The method of claim 8, wherein the low power, low speed protocol is Bluetooth.

11. The method of claim 8, wherein the high power, high speed protocol is Wi-Fi.

12. A method for efficiently utilizing high speed communications between first and second wireless devices, comprising:
causing carrier circuitry in the first device to transmit a signal seeking another wireless device;
performing a handshake operation with the second device in accordance with Bluetooth protocol standards after the second device responds to the signal;
establishing wireless communications between the first and second devices in accordance with the Bluetooth protocol;
determining that the second device is capable of communicating using Wi-Fi; and
switching the wireless communications between the first and second devices from Bluetooth to Wi-Fi, wherein the switch from Bluetooth to Wi-Fi is performed when a size of a data transfer between the first and second devices exceeds a predetermined size.

13. The method of claim 12, wherein the first device is a computer.

14. The method of claim 12, wherein the first device is a portable media player.

15. A first portable electronic device comprising:
a carrier portion operable to communicate wirelessly using at least two different communication protocols;
an application portion that enables wireless communications to begin utilizing Bluetooth protocol until a second device which is operable in Bluetooth and Wi-Fi is identified; and
switching circuitry that causes the carrier portion to switch from Bluetooth to Wi-Fi in the event that high speed communications is required, wherein the high speed communications is required when a size of a data transfer between the first and second devices exceeds a predetermined size.

16. The first portable device of claim 15, wherein the application portion comprises circuitry that utilizes Bluetooth handshaking to establish communications between the first and second devices.

17. The first portable device of claim 16, wherein the application portion comprises circuitry that utilizes Bluetooth communications to establish that the second device is capable of communicating utilizing Wi-Fi.

18. The first portable device of claim 17, wherein the application portion causes the carrier portion to go into power saving STANDBY mode upon completion of Wi-Fi transmissions.

19. The first portable device of claim 15, wherein the first portable device comprises a computer.

20. The first portable device of claim 15, wherein the first portable device is a cellular telephone.

21. The first portable device of claim 15, wherein the first portable device is a portable multi-media player.

* * * * *